(12) United States Patent
Lynam et al.

(10) Patent No.: US 6,934,372 B1
(45) Date of Patent: Aug. 23, 2005

(54) SYSTEM AND METHOD FOR ACCESSING THE INTERNET ON A PER-TIME-UNIT BASIS

(75) Inventors: Joe Lynam, Cupertino, CA (US); Ken Dawson, Pleasanton, CA (US); Brendan Philbin, San Jose, CA (US); Greg Calcagno, San Jose, CA (US); Jennifer Truitt, Campbell, CA (US)

(73) Assignee: PaymentOne Corporation, San Jose, CA (US)

( * ) Notice: Subject to any disclaimer, the term of this patent is extended or adjusted under 35 U.S.C. 154(b) by 0 days.

(21) Appl. No.: 09/467,693

(22) Filed: Dec. 21, 1999

(51) Int. Cl.[7] ............................................. H04M 15/00
(52) U.S. Cl. .................. 379/111; 379/124; 379/206.01; 705/32; 705/418
(58) Field of Search .................. 379/111–124, 206.01; 705/30–34, 418, 40, 400

(56) References Cited

U.S. PATENT DOCUMENTS

| | | | |
|---|---|---|---|
| 5,313,463 A | | 5/1994 | Gore et al. |
| 5,329,589 A | | 7/1994 | Fraser et al. |
| 5,524,142 A | | 6/1996 | Lewis et al. |
| 5,537,464 A | | 7/1996 | Lewis et al. |
| 5,544,229 A | | 8/1996 | Creswell et al. |
| 5,633,919 A | | 5/1997 | Hogan et al. |
| 5,655,007 A | | 8/1997 | McAllister |
| 5,740,427 A | | 4/1998 | Stoller |
| 5,748,890 A | | 5/1998 | Goldberg et al. |
| 5,845,267 A | | 12/1998 | Ronen |
| 5,867,494 A | | 2/1999 | Krishnaswamy et al. |
| 5,867,566 A | | 2/1999 | Hogan et al. |
| 5,898,765 A | | 4/1999 | Teglovic et al. |
| 5,956,391 A | * | 9/1999 | Melen et al. ............... 379/114 |
| 5,963,625 A | | 10/1999 | Kawecki et al. |
| 6,023,499 A | * | 2/2000 | Mansey et al. ............. 379/111 |
| 6,023,502 A | | 2/2000 | Bouanaka et al. |
| 6,055,513 A | | 4/2000 | Katz et al. |
| 6,094,644 A | * | 7/2000 | Hillson et al. ............... 705/400 |
| 6,104,798 A | | 8/2000 | Lockiss et al. |
| 6,137,869 A | * | 10/2000 | Voit et al. .................... 379/114 |
| 6,163,602 A | | 12/2000 | Hammond et al. |

(Continued)

OTHER PUBLICATIONS

Rob Kling, "4.1.2. Consumer Convenience and Protection", Software patent Institute Database of Software Technologies, 1978, pp. 1–3, USA, web page http://m.spi.org/cgi–bin/newqry?ISA . . . ec=4&submit=seeit&csum=1101-84817619.

*Primary Examiner*—Richard Chilcot
(74) *Attorney, Agent, or Firm*—Schwegman, Lundberg, Woessner & Kluth, P.A.

(57) ABSTRACT

A system and method for accessing the internet on a per-time basis, through an Internet service provider (ISP), includes an access station. Application software is provided to an electronic terminal, from which Internet access may be attempted. Upon initiation of the application, the access station is dialed, and a number of processing steps serve as a precondition to permitting the electronic terminal to access the Internet through the Internet service provider. In particular, upon an initial attempt to access the Internet, the access station sets up an account in which the telephone number from which access is attempted is utilized for subsequent billing purposes. The access station further determines whether the telephone number from which access is desired is within an acceptable network, is associated with an undesirable credit risk, and is a valid telephone number. In the event the electronic terminal passes these validation procedures, the access station transmits account information to the electronic terminal and directly to the Internet service provider. Additionally, the access station transmits an ISP identifier (such as a modem telephone number) whereupon the electronic terminal initiates a communications link with the Internet service provider.

19 Claims, 8 Drawing Sheets

U.S. PATENT DOCUMENTS

| | | |
|---|---|---|
| 6,195,697 B1 | 2/2001 | Bowman-Amuah |
| 6,208,720 B1 | 3/2001 | Curtis et al. |
| 6,212,262 B1 | 4/2001 | Kamel |
| 6,233,313 B1 | 5/2001 | Farris et al. |
| 6,247,047 B1 | 6/2001 | Wolff |
| 6,260,024 B1 | 7/2001 | Shkedy |
| 6,272,152 B1 | 8/2001 | Levin et al. |
| 6,282,276 B1 | 8/2001 | Felger |
| 6,289,010 B1 | 9/2001 | Voit et al. |
| 6,295,292 B1 | 9/2001 | Voit et al. |
| 6,330,543 B1 | 12/2001 | Kepecs |
| 2002/0147658 A1 | 10/2002 | Kwan |

* cited by examiner

PACIFIC💧BELL.

Account Number                  Statement Date
408 229 765 N 6159              Dec  4, 1998                                Page   11

Questions about your bill?      1-800-736-7500

Integretel
Total Current Charges (See detail below)

Monthly Charges

| | Description | | | | | | | Amount |
|---|---|---|---|---|---|---|---|---|
| 1. | Tax: Fed. | .60 | 911 | | Local: | 1.00 | | 1.60 |

Total Monthly Charges                                                        $1.60

Calls from 408 XXX-XXXX
Billed on Behalf of AOL Access By The Minute
Direct Dialed ISP Access Calls:

| | Date | Time | Place and | Number Called | Type | Rate | Minutes | Amount |
|---|---|---|---|---|---|---|---|---|
| 6. | Feb 8 | 3:37pm | Billing | MT 444 555-7777 | Direct | Day | 6 | .42 |
| 7. | Feb10 | 2:17pm | Billing | MT 444 555-7777 | Direct | Day | 10 | .70 |
| 8. | Feb11 | 5:17pm | Billing | MT 444 555-7777 | Direct | Eve | 23 | 1.61 |
| 9. | Feb14 | 12:30am | Billing | MT 444 555-7777 | Direct | Night | 7 | .49 |
| 10. | Feb16 | 2:56pm | Billing | MT 444 666-7777 | Direct | Day | 56 | 3.92 |
| 11. | Feb18 | 5:42pm | Billing | MT 444 555-7777 | Direct | Eve | 94 | 6.58 |
| 12. | Feb22 | 4:46pm | Billing | MT 444 555-7777 | Direct | Day | 13 | .91 |
| 13. | Feb23 | 12:56pm | Billing | MT 444 555-7777 | Direct | Day | 10 | .70 |
| 14. | Feb23 | 8:31pm | Billing | MT 444 555-7777 | Direct | Eve | 5 | .35 |
| 15. | Feb23 | 8:34pm | Billing | MT 444 555-7777 | Direct | Eve | 46 | 3.22 |

Total ISP Access Calls                                                       $18.90

Taxes & Surcharges

| | Description | | Amount |
|---|---|---|---|
| 16. | Charges for Network Access for Interstate Calling, Imposed by Federal Communications Commission | B | 3.50 |
| 17. | CA High Cost Fund Surcharge — A | | .60 |
| 18. | California Teleconnect Fund Surcharge | | .01 |
| 19. | Rate Surcharge | 60 | 1.34 |
| 20. | State Regulatory Fee | | .01 |
| 21. | CA Relay Service and Communications Devices Fund | | .03 |
| 22. | Tax: Fed. .59   911: .11   Local: .80 | | 1.50 |

Total Taxes & Surcharges                                                     $4.31

13 6291 BC51 1A 408 2344567 765 951381857   R001   RTEN 9273

Figure 4.

SYSTEM AND METHOD FOR ACCESSING THE INTERNET ON A PER-TIME-UNIT BASIS

BACKGROUND OF THE INVENTION

1. Field of the Invention

The present invention is generally directed to a system and method for accessing a global electronic communications network. More particularly, the present invention is directed to a system and method for accessing the Internet from an electronic terminal, wherein an account associated with the electronic terminal is billed in monetary units corresponding to the length of time the electronic terminal is connected to the Internet.

2. Description of the Related Art

Internet access has conventionally required users to obtain a subscription from an Internet service provider. The form of such subscriptions vary, depending upon the provider and the quantity of internet access desired. For example, one conventional approach is to charge a subscriber a fixed monetary amount for unlimited use of the Internet, via the provider, during a predetermined period, such as a month. In variations of this approach, a user may be charged a first fixed amount for a first amount of access time during a given period, and then additional amounts for access over the initially allotted time. Charges for Internet access are typically billed to a financial account, such as a credit card of the subscriber.

One drawback to conventional approaches for providing an Internet access is the requirement is that the user establish a subscription and, particularly, the requirement that a user enter financial account information in order to establish the subscription. While electronic transactions over the Internet are becoming increasingly common place, a significant number of individuals, and especially those that may remain skeptical of security issues or, alternatively, those that simply have had little or no exposure to the Internet, may remain unwilling to submit financial information to an Internet service provider in order to establish the subscription. Additionally, those users that access the Internet infrequently or sporadically may be unwilling to incur periodic subscription charges.

Accordingly, the need exists for a system and method for accessing the Internet that provides an alternative to existing Internet access arrangements. In particular, the need exists for a system and method for accessing the Internet in a manner which does not require a conventional subscription. The present invention fulfills these and other needs.

SUMMARY OF THE INVENTION

The present invention is a system and method for accessing global electronic communications network and, particularly, for accessing the Internet. The system of the present invention has an Internet access station, and a site associated with an Internet service provider. Using an electronic terminal, such as a personal computer, or a fixed, portable, or mobile computing station, a user may access the Internet via the Internet service provider, albeit in accordance with the unique aspects of the present invention.

In accordance with one aspect of the present invention, the access station is a site at which various processes are performed as a precondition to permitting the electronic terminal to establish a communications link with the Internet service provider. Additionally, the access station also preferably serves as a billing station, such that charges associated with Internet access with the electronic terminal, through the Internet service provider, are billed to the user of the electronic terminal via the access station.

In particular, in accordance with the principles of the present invention, application software for permitting the user of the electronic terminal to access the Internet are provided to the electronic terminal. The application software permits a user of the electronic terminal to establish a communications link with the access station. Once a communications link with the access station is established, the access station, utilizing a processor, processes a series of steps in order to automatically establish an account associated with the electronic terminal. Once the account is established, information indicative of the account is transmitted via the communications link back to the electronic terminal along with connection information, such as a telephone number, for enabling the electronic terminal to initiate a second communications link with the Internet service provider. Additionally, information indicative of the established account is transmitted via a third communications link from the access station directly or at scheduled intervals to the Internet service provider, where it is stored as a profile.

Upon receipt by the electronic terminal of the account information and connection information, the first communications link between the electronic terminal and the access station is terminated, and the electronic terminal (using the connection information received from the access station) initiates a second communications link with the Internet service provider. Once the second communications link between the electronic terminal and Internet service provider is established, the electronic terminal transmits the account information received from the access station to the Internet service provider. The Internet service provider processes that information by comparing it with the short profile information received from the access station, in order to confirm that the electronic terminal seeking access is a valid terminal for which access should be permitted. Upon completion of that validation process, the electronic terminal is logged on to the Internet via the Internet service provider.

In accordance with an aspect of the present invention, upon initiation of the second communications link between the electronic terminal and the Internet service provider or, at some other convenient time, such as upon a log on time to the Internet, the Internet service provider begins monitoring the time of the second communications link (or log on time). That time duration is monitored in time units, such as minutes, and is stored in an electronic memory of the Internet service provider for periodic transmission directly to the access station. It will be understood and appreciated that while the time of the communications link or Internet access time is preferably transmitted from the Internet service provider to the access station periodically, it may be continuously transmitted via a direct communications link between the Internet service provider and access station. At the access station, the time units associated with the second communications link, or log in time, is associated with the account established for the electronic terminal, and a monetary rate is multiplied by the time units for billing purposes. In particular, although the monetary charges may be calculated at the Internet service provider, these calculations may be made at the access station by multiplying the number of monetary units associated with a particular log in session by a published rate, and associating the resulting charges with the established account.

In accordance with a particular aspect of the present invention, the access station automatically determines the telephone number from which the electronic terminal is accessing the access station. In a preferred embodiment, the determined telephone number is utilized as a billing number in the process of establishing the account. Thus, in accordance with the invention, any charges associated with Internet access per time unit are billed to an account or subscription associated with the telephone number from which the electronic terminal accesses the access station. Particularly, the charges are consolidated on a telephone bill which includes other charges corresponding to the telephone number, such as local and long distance telephone calls.

Additionally, before permitting the electronic terminal to link with the Internet service provider, the access station preferably performs various validation processes for determining whether the telephone number associated with the electronic terminal is acceptable for billing purposes. For example, the access station preferably determines whether the telephone number is within one or more selected networks, and determines whether there are other acceptable credit risks associated with the telephone number. Additionally, the access station preferably retrieves information from a line information data base (LIDB) to ascertain whether the telephone number is associated with a valid, existing telephone line subscription. These validation features are provided upon initial access by the electronic terminal to the access station, but are preferably only provided on subsequent Internet access attempts when the time lapse between access attempts is greater than a predetermined period, such as for example, 30 days.

BRIEF DESCRIPTION OF THE DRAWINGS

The objects and features of the invention noted above are explained in more detail with reference to the drawings, in which like reference numerals denote like elements, and in which:

FIG. 4 is an example of monetary charges incurred for accessing the Internet in accordance with the principles of the present invention, wherein those charges are consolidated on a standard telephone bill.

DETAILED DESCRIPTION OF THE INVENTION

Figure 1:
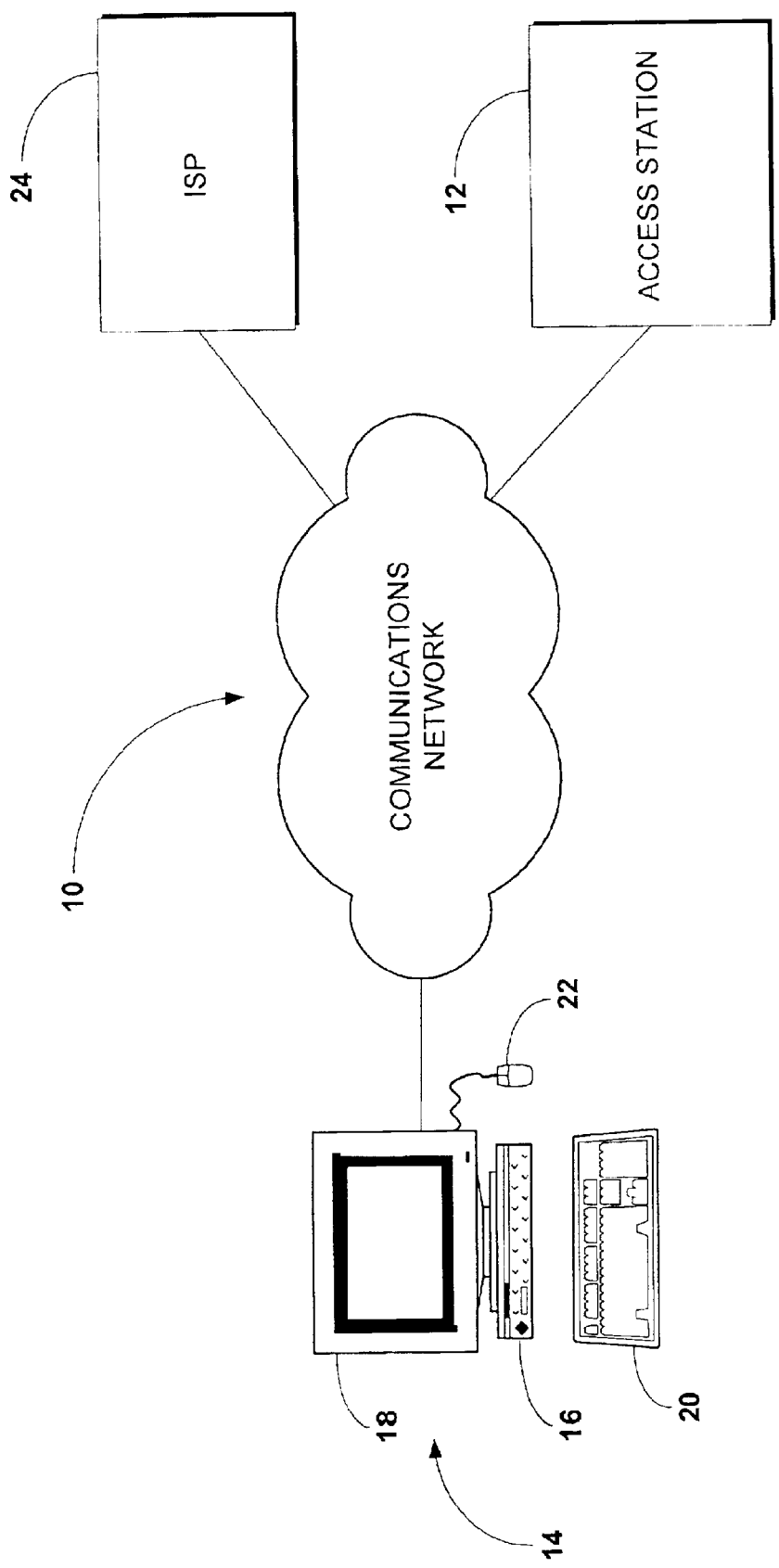
FIG. 1 is a block diagram of the Internet access system of the present invention.

With reference initially to FIG. 1, an Internet access system of the present invention is denoted generally by reference numeral 10. The Internet access system 10 of the present invention has an Internet access station, denoted by reference numeral 12, which serves a variety of functions, as described in detail below. In particular, Internet access station 12 is preferably a site on a global communications network at which an Internet access account is established and maintained, at which Internet access validation procedures are conducted and at which various billing activities are processed The Internet access system 10 further includes an electronic terminal 14. Electronic terminal 14 is illustrated in FIG. 1 as a personal computer having a processor 16, a display 18, a keypad input 20, and a mouse 22. It will be understood and appreciated that the electronic terminal 14 may include other desired components, such as microphone input, speakers, a scanner, a web camera, etc. Additionally, it should be understood and appreciated that the electronic terminal 14, rather than being a conventional personal computer, may be any type of electronic terminal for accessing the Internet For example, the electronic terminal 14 may be a portable or laptop computer, or a mobile or wireless Internet equipped communications device, such as a cellular telephone.

Internet access system 10 further includes an Internet service provider, denoted generally by reference numeral 24. Internet service providers are well known. In particular, Internet service provider 24 is a site, at an address, on a global communications network. In particular, Internet service provider 24 is a site which serves as a portal through which users of electronic terminals may access the Internet. As illustrated, a communications network is provided for establishing communications links between electronic terminal 14, access station 12, and Internet service provider 24. The communications network may be any conventional type of network, such as a telephony network, or a data network, may be a broadband (or not) network, etc. or any combination thereof. Access to the network, through the various components of the present invention, may be made in a conventional manner through interface components, such as a modem or transceiver.

With additional reference to FIGS. 2a–2c, the system 10 and its method of operation will be described in detail.

Figure 2A:
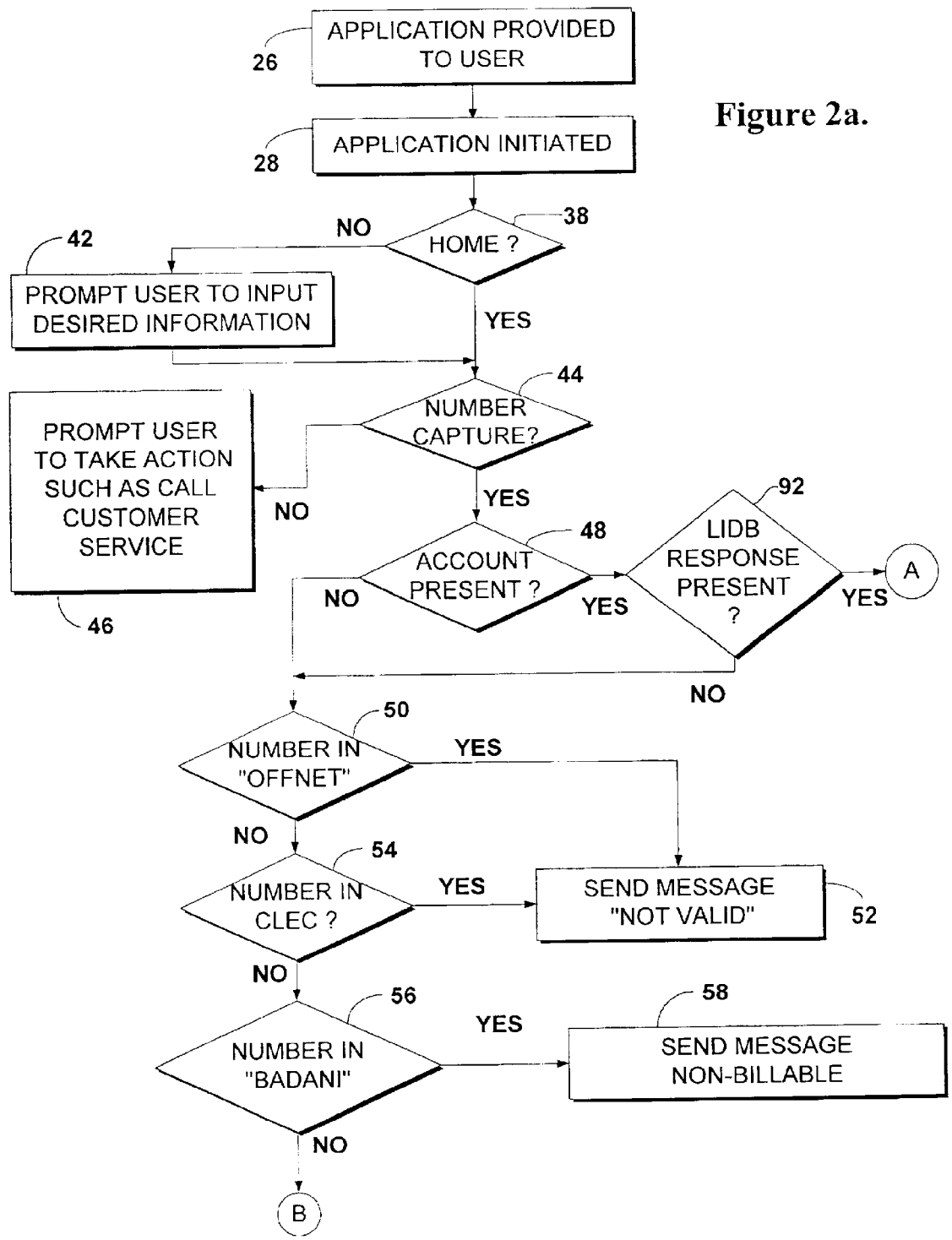
FIGS. 2a–2c illustrate a flow chart illustrating the method of the present invention and the software processes performed by the present invention.
Figure 2B:
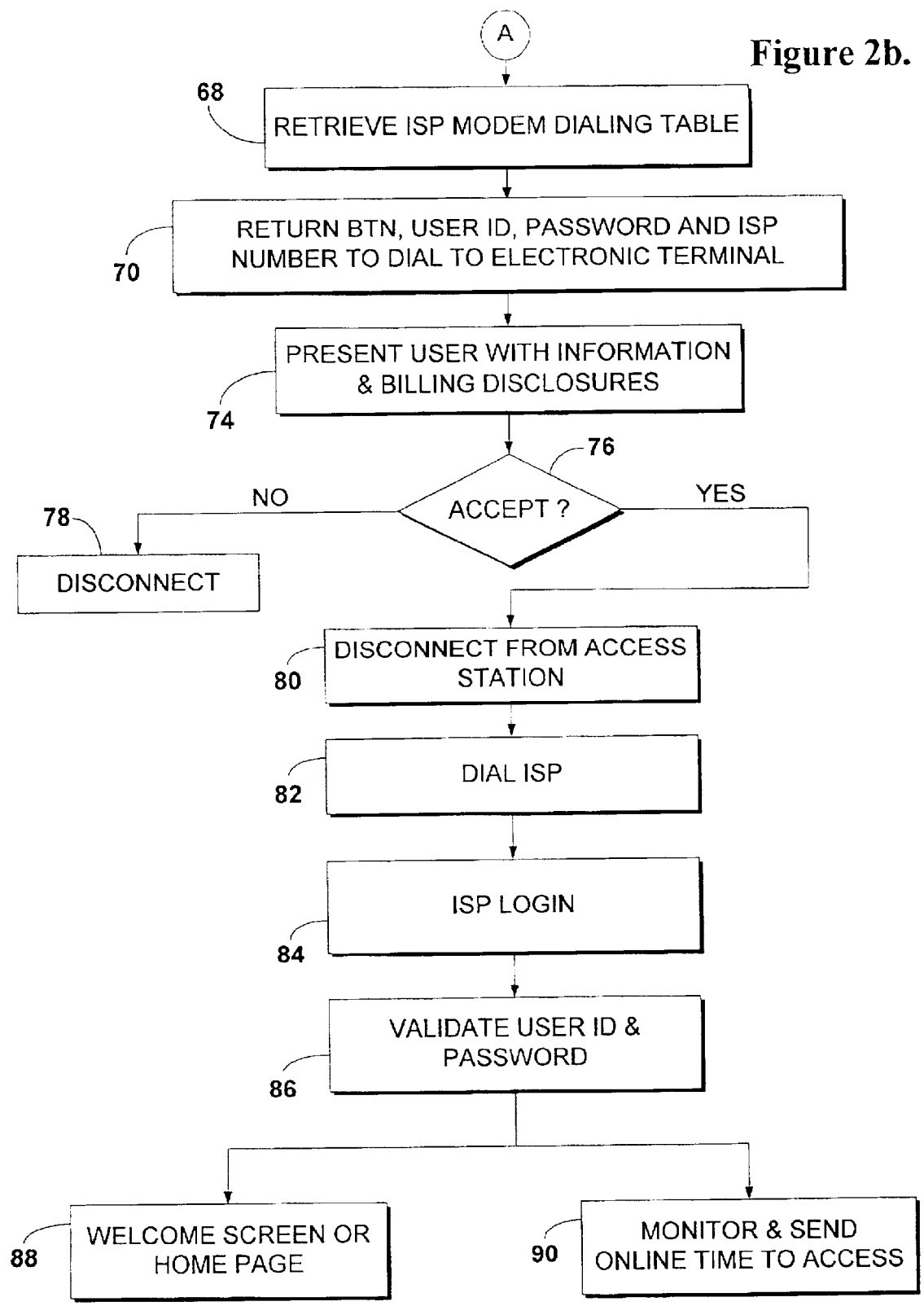
Figure 2C:
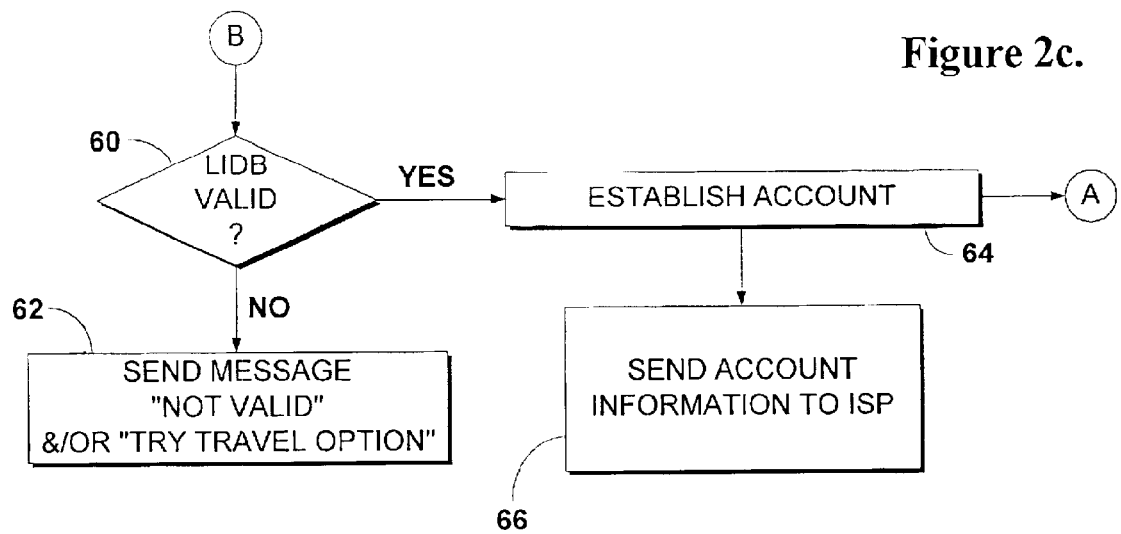

In accordance with an aspect of the present invention, and as indicated at step 26 in FIG. 2a, an Internet access software application is provided to electronic terminal 14 in any conventional manner. For example, a user of electronic terminal 14 may download the necessary application software from access station 12 or Internet service provider 24. Alternatively, the application software may be provided on a transferable medium, such as a CD, with which the electronic terminal 14 communicates. Thus, as will be understood and appreciated, the application software may be stored on either a portable, transferable medium, or may be stored on a hard drive memory within the electronic terminal 14. Alternatively, the Internet access application software of the present invention may be provided in an open system arrangement, in which the Internet access software of the invention is provided at the access station 12, such that electronic terminal 14 communicates with the application software via the communications network, although the application software is not physically stored at the electronic terminal 14.

Figure 3A:
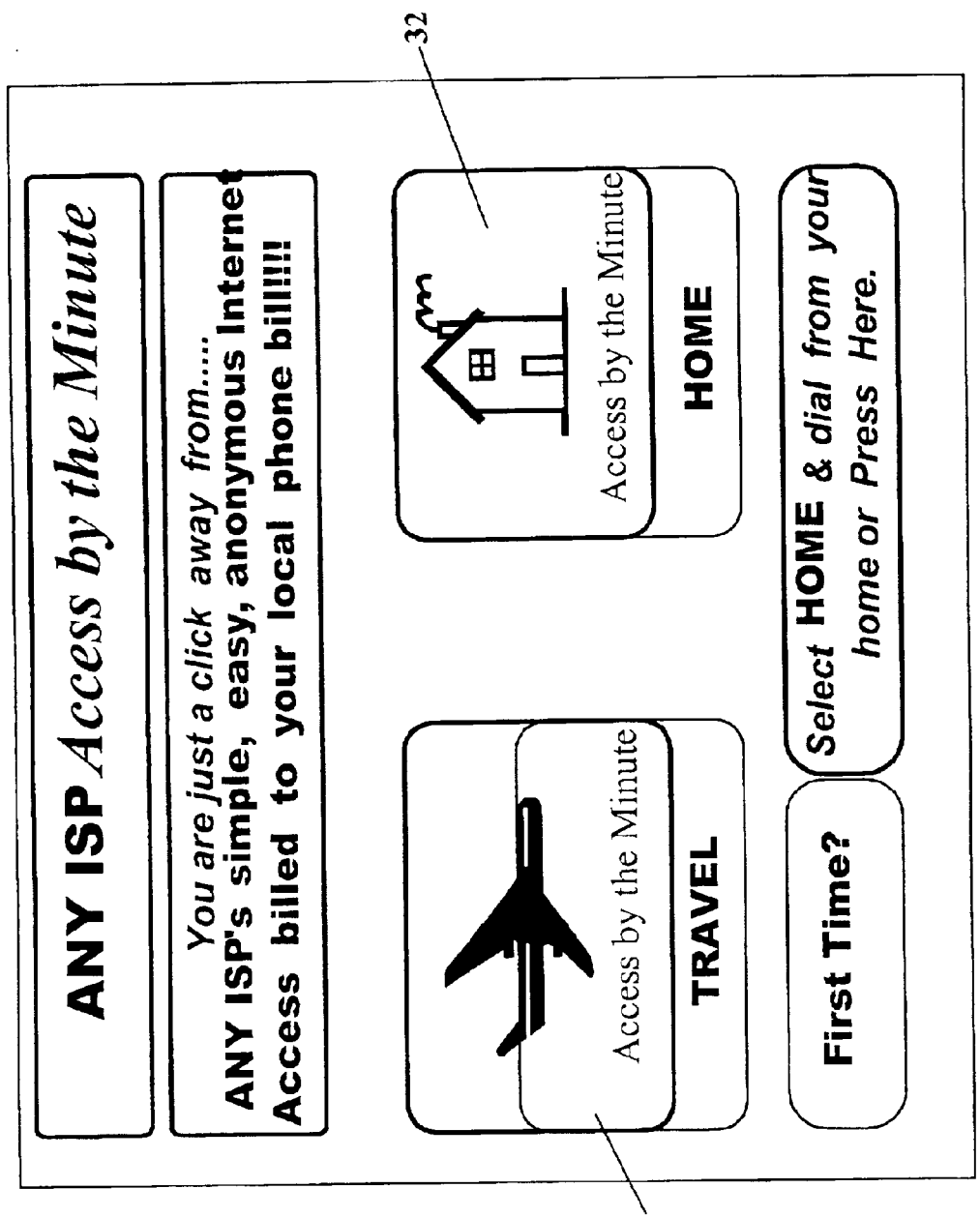
FIGS. 3a–3c are examples of screen displays provided on the display screen of the electronic terminal utilized for accessing the Internet in accordance with the principles of the present invention.
Figure 3B:
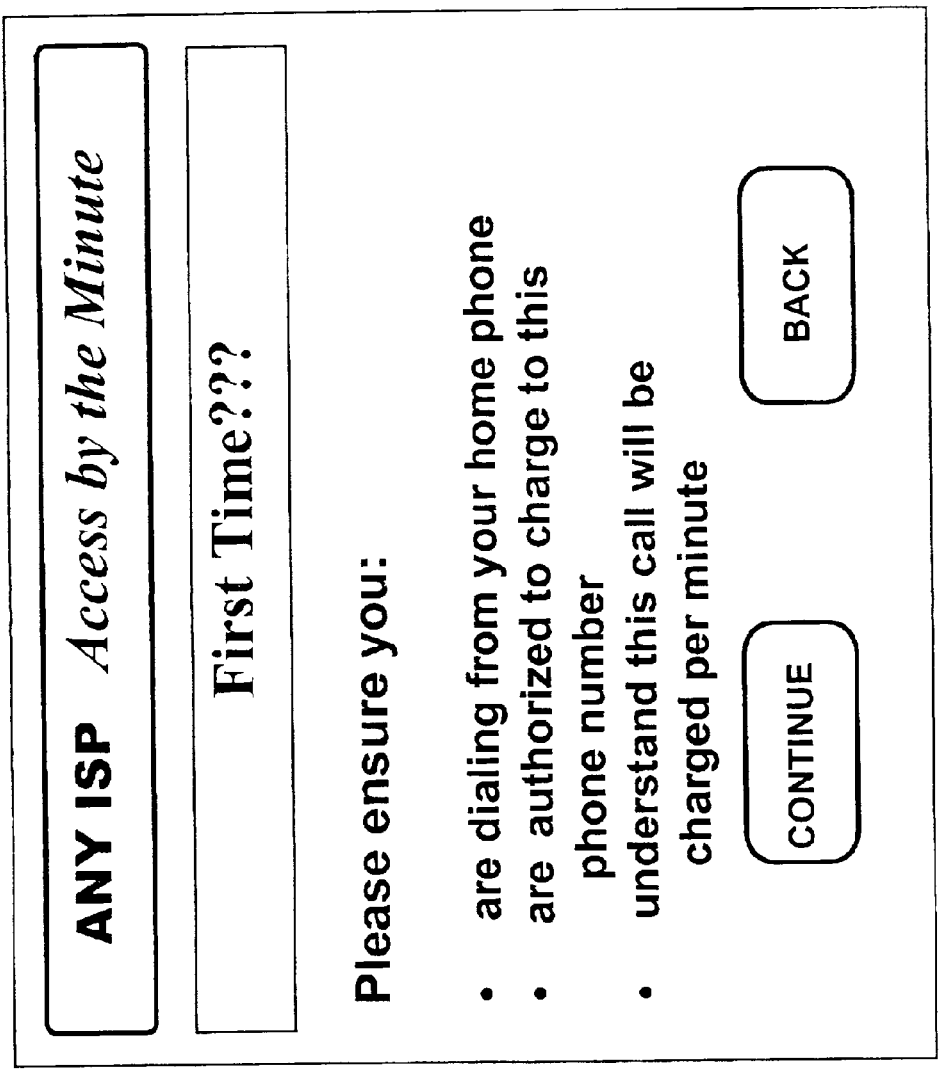

As indicated at reference numeral 28, a user of electronic terminal 14 initiates the Internet application software of the present invention in any conventional manner, such as by utilizing computer mouse 22 to click on an icon associated with the software displayed on display screen 18. Upon initiation of the application software at step 28, electronic terminal 14 displays at display 18 a display screen, such as that illustrated in FIG. 3a In particular, the display screen provides the user of electronic terminal 14 with several options. For example, the display screen may provide an area for accessing the Internet from a home location as indicated by area 32 on the display screen, or for accessing the Internet from a remote, travel location, as indicated by area 34 on the display screen. The present invention may also provide to the user the option to access a "first time ?" interface, whereupon the user will be taken to a page providing various comments and instructions relating to first time use. For example, as illustrated in FIG. 3b, if the user clicks on an area associated with "first time" use, the application may provide an individual with detailed instructions regarding the various choices available to the user. Additional information, such as indications that the user will be charged to his or her local phone bill on a per-time basis for Internet access, along with prompts requiring user entry to indicate whether or not the user wishes to continue may be included.

Additionally, the application prompts the user to input various information, such as the telephone number from which dialing is taking place, whether call waiting is a feature (so that it may be disabled, if necessary), and other dialing information (e.g., 9 or 8 access, area code information, etc.). Alternatively, some or all of the input information may be captured automatically, such as with a caller-id feature, etc. Additionally, all gathered data is stored in memory by the application for retrieval upon subsequent uses.

In short, regardless of where the information is provided (e.g., on the opening page, or after accessing one or more pages associated with a "help" feature, or a "first time" feature) when the user initially utilizes system 10, and particularly the software application thereof, the user is prompted to proceed via the "home location" area 32. As indicated at step 38 of FIG. 2, when the user selects Internet access from the home location, processing advances to step 42 for initiating a communications link with access station 12. Alternatively, as will be described in greater detail below, when the user desires to access the Internet from a non-home location, such as is the case when a user has a portable or laptop computer, and, for instance, is traveling and is thus attempting to access the Internet through a telephone line other than the user's home telephone line, the processing advances to step 40, wherein the user is prompted to enter additionally required information. In such an instance, for example, the user may be prompted to input additional information, such as the type of communications line relied upon at the remote location (e.g., pay phone, air phone, hotel, work, someone else's home, etc.). Additionally, information pertaining to the telephone number from which access is being desired may also be required, such as specific dialing instructions necessary from dialing at a remote location (e.g., the requirement to dial a "8" prior to dialing from a hotel, etc.). In either event, electronic terminal 14 may initiate a communications link by dialing a telephone number of the access station (e.g., a toll free or non-toll free number, including but not limited to a 1-800 or 1-900 number), or by otherwise linking with a server associated with an electronic address of the access station.

Once the electronic terminal 14 establishes a communications link with the access station 12, the access station 12, utilizing a processor and software, executes a number of processing steps and makes a number of determinations. In particular, upon the initial time the electronic terminal 14 links with the access station, the access station performs a number of validation functions in an effort to establish an account associated with the electronic terminal 14. As will become apparent from the detailed discussion below, upon subsequent links with access station 12, various validation features are performed, but the account need not be reestablished.

In particular, once a communications link is established between the electronic terminal 14 and the access station 12, an automatic number identification (ANI) process occurs, in which the access station 12 determines the telephone number from which the electronic terminal 14 is communicating. As indicated at step 44 of FIG. 2, access station 12 determines whether the telephone number from which the electronic terminal 14 is dialing has been captured. As indicated at step 46, in the event the telephone number has not been captured, the access station 12 transmits a message back to the electronic terminal 14 prompting the user to action such as call customer service. Alternatively, once the telephone number from which electronic terminal 14 is dialing has been captured and stored at the access station 12, the access station 12 determines whether an account has already been established with respect to the captured telephone number. As will be described below, in the process of initially establishing an account, the access station initially establishes the captured telephone number as a billing telephone number to which charges associated with Internet access time will be billed. As additionally described below, the access station also assigns a user identification and password to the billing telephone number, thereby establishing the account. Accordingly, at step 48, where it is determined whether an account has already been established with respect to the captured telephone number, the processor at access station 12 searches an associated database which stores account information to determine whether the captured telephone number has been assigned to an associated billing telephone number and/or whether the telephone number has an associated user identification and/or password.

In the event an account has not already been established with respect to the captured telephone number, such as is the case when electronic terminal 14 is initially utilized to access the Internet via the system 10 of the present invention, processing advances to step 50. At step 50, the access station 12 determines whether the captured telephone number (e.g., "ANI") is in a particular network that is not affiliated with the access station. In other words, there may be various communications networks with which billing arrangements have not been established, and a determination is made at step 50 whether the captured telephone number is within a predetermined network. In particular, as illustrated, the determination is made whether the captured telephone number is within "OFFNET", which is intended to identify an off network (e.g., one with which a billing arrangement has not been established). It will be understood and appreciated that the determination made may be whether the captured telephone number is within a non-acceptable network or, alternatively, by making a determination whether the captured telephone number is within an acceptable network. As illustrated, in the event the captured telephone number is in a non-acceptable network, such as the case when the captured telephone number is in "OFFNET", processing advances to step 52, wherein the access station 12 sends a message back to the electronic terminal 14 indicating that the telephone number from which access is desired is not valid. Alternatively, when it is determined that the captured telephone number is not within "OFFNET", and therefore may be acceptable, processing advances to step 54, where access station 12 determines the captured telephone number is within a CLEC (competitive local exchange carrier) network database), thus preventing the billing of Internet access charges directly to a telephone bill.

As illustrated, if the captured telephone number is within the CLEC database, processing advances to step 52, and under such circumstances, a message is transmitted from access station 12 to electronic terminal 14 indicating that the telephone number from which Internet access is desired is not valid. However, if the captured telephone number is not within the CLEC database, as determined at step 54, processing advances to step 56, where access station 12 determines whether the captured telephone number has an unacceptable associated credit risk. In this regard, a data base of telephone numbers associated with certain credit risk standards is maintained, such that the captured telephone number is checked against those telephone numbers accumulated in the data base, in an effort to determine whether the captured telephone number is associated with an unacceptable or questionable credit risk. As illustrated, if it is indeed determined that the captured telephone number is associated with an unacceptable or questionable credit risk, processing advances to step 58, wherein the access station transmits a message to the electronic terminal 14 indicating that the telephone number from which access is desired is potentially non-billable, and may further requests user action such as a user to telephone the access station 12. However, in the event customer service 12 determines at step 56 that the captured telephone number is not associated with an undesirable or questionable credit risk (e.g., not in a "BADANI" database as illustrated), processing advances to step 60.

At step 60, access station 12 determines whether the captured telephone number is a valid telephone number. In other words, access station 12 checks the telephone number against a line information database (LIDB) in making a validity decision with respect to the captured telephone number. As indicated, in the event a LIDB check results in a determination that the captured telephone number is not valid, processing advances to step 62, and access station 12 sends the electronic terminal 14 a message that the telephone number from which access is desired is not valid, and prompts the user to consider take action such as a call to customer service.

When, however, it is determined at step 60, as a result of the LIDB check, that the captured telephone number is indeed a valid telephone number, processing then advances to step 64, where access station 12 considers the captured telephone number to be a billable telephone number (BTN) (e.g., the number to which Internet access charges will be billed), and access station 12 automatically assigns a user identification and password to the billing telephone number to thereby establish an account with respect to the captured telephone number from which electronic terminal 14 is attempting to access the Internet. Access station 12 then stores the BTN, and associated user ID and password in a database. As indicated at step 66, access station 12 also then sends at that time or at scheduled intervals, via a direct communications link with Internet service provider 24, the account information that has been established with respect to electronic terminal 14. In particular, access station 12 sends to ISP 24 at least the user identification and password associated with the established account. As will become apparent from the following discussion, the Internet service provider 24 will subsequently use the retrieved account information to validate an attempt by the electronic terminal 14 to access the Internet via the ISP 24.

Additionally, once an account has been established at step 64, the processing advances to step 68, where the access station 12 retrieves a table of identifiers (e.g., telephone numbers or server addresses, associated with Internet service provider 24). In other words, the retrieved table includes, for example, modem dialing information associated with Internet service provider 24.

Processing then advances to step 70 at which the access station 12 transmits the established account information, such as the billable telephone number (BTN), user identification, password, and at least one telephone number or address associated with the ISP 24, and retrieved from the dialing table, for the purpose of permitting the electronic terminal 14 to establish a communications link with ISP 24. In particular, and in accordance with the principles of the present invention, the identifier or identifiers (e.g., the telephone number or numbers retrieved from the ISP dialing table), are preferably determined based upon a location of the telephone number from which access is being allowed or from the location of the billable telephone number and, additionally, in the case where multiple identifiers are retrieved, they are preferably prioritized in accordance with selected criteria. In particular, local telephone numbers are given priority.

Figure 3C:
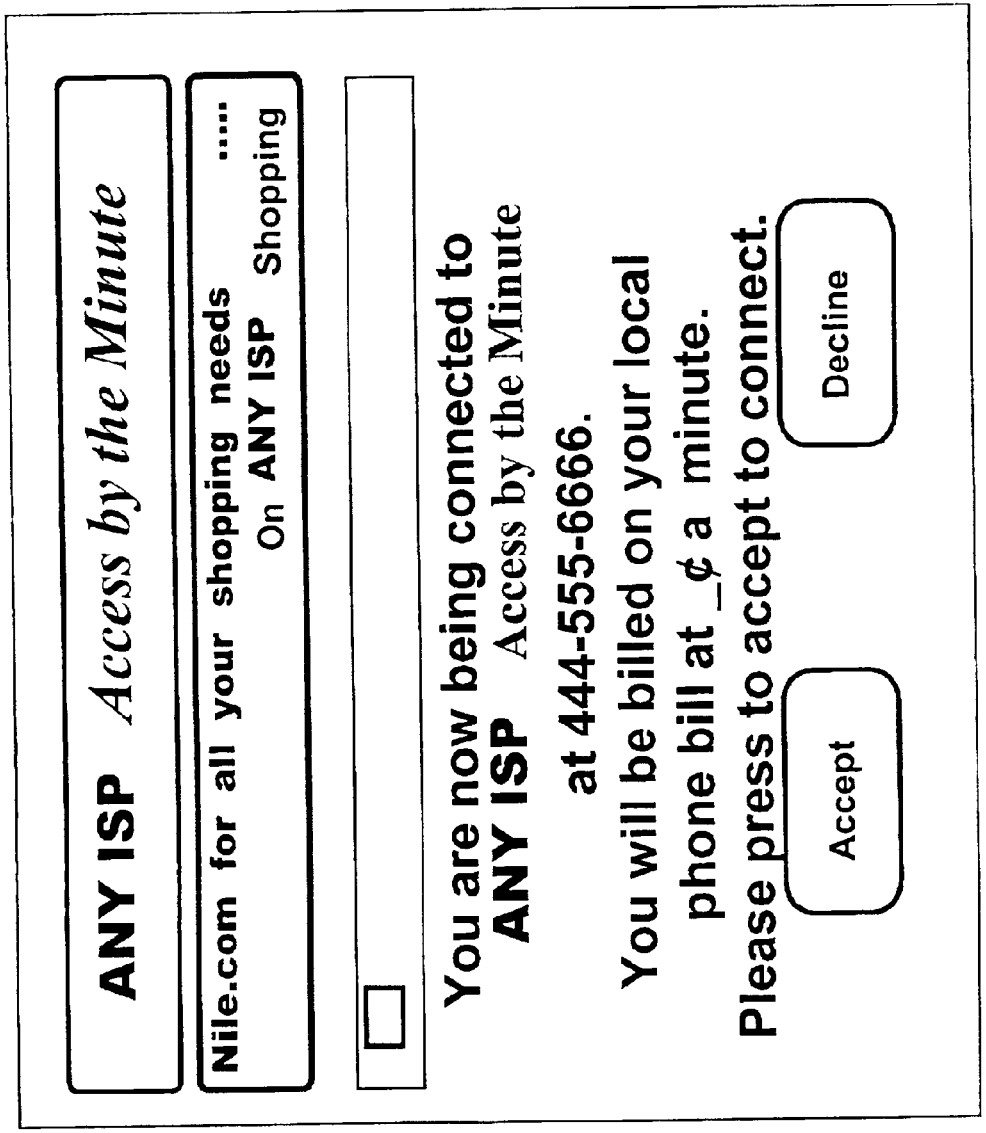

At step 70 once the access station 12 has returned the billable telephone number, user ID, password, and one or more identifiers (e.g., telephone numbers or addresses) of the ISP 24 to the electronic terminal 14, processing advances to step 74. At step 74, the user is presented with information and billing disclosures (which may be retrieved from the electronic terminal 14, but which are preferably transmitted from access station 12). As indicated at 76, the user is prompted to accept or not accept the proposed billing agreement. An example of a display screen associated with step 76 is ilustrated in FIG. 3c. In this regard, and in accordance with an aspect of the invention, the information provided by the billing disclosure indicates that the user will be charged to his or her home telephone number (e.g., the telephone number from which electronic terminal 14 access accesses station 12), and the user is given rate information, (such as monetary charges per minute). For example, the stated charges may be a number of cents (USA) per minute. Alternatively, the charges could be per second, per six second increments, or in other increments. As indicated at step 78, if the user elects to deny the billing proposal, processing advances to step 78 and the communications link with the access station 12 is terminated. Alternatively, when the user, at step 76, accepts the billing proposal, processing advances to step 80 and then to step 82, where the communications link between the electronic terminal 14 and access station 12 is terminated, and the electronic terminal 14 initiates a communications link with ISP 24 by dialing ISP 24, respectively. As indicated at step 86, once a communications link has been established between electronic terminal 14 and the ISP 24, the processor at ISP 24 makes a determination of whether the electronic terminal 14 desiring to access ISP 24 is valid. In particular, the electronic terminal 14 sends, via the communications link with ISP 24, the account information that the electronic terminal 14 previously received from access station 12. In particular, electronic terminal 14 transmits data indicative of at least the user identification and password, and the billable telephone number may also be transmitted. A processor at the ISP 24 retrieves the account information data and compares it with the data previously transmitted from access station 12 to determine whether the electronic terminal 14 is associated with a "valid" account. When the ISP 24 is unable to read the account information transmitted by electronic terminal 14, or in the situation where the received account information is not found in the data base of accounts deemed to be valid, log onto the ISP 24 is denied. However, as indicated at step 88, once the account associated with electronic terminal 14 is properly validated, ISP 24 opens a welcome screen or home page, from which the user can browse the Internet or access one or more selected features presented to the user in a conventional fashion.

Additionally, ISP 24 monitors a time associated with a communications link between electronic terminal 14 and ISP 24. In this regard, while the time monitored may encompass the entirety of the time associated with a communications link, preferably ISP 24 begins monitoring time only after log on validation procedures have been conducted and the user of electronic terminal 14 is actually logged in to ISP 24. While charges for Internet access time preferably begin after log in, any other communications charges may begin at the establishment of the communications link. It should be understood that the access time may alternatively be monitored from a time associated with access to particular content (e.g., news, video, etc.) or that different or increased rates may apply to the access or downloading of selected content.

Preferably, as indicated at step 90, ISP 24 periodically sends information to access station 12 regarding the amount of time electronic terminal 14 accesses ISP 24. It will be understood and appreciated that this on-line time information, transmitted from ISP 24 to access station 12, is preferably transmitted directly from ISP 24 to access station 12, and not via electronic terminal 14. Additionally, it will be understood and appreciated that the on-line time information may be transmitted from ISP 24 to access station 12 at any preferable interval (such as hourly, daily, etc.). Additionally, the intervals may be varied such that the information is not transmitted at the same time each day.

Returning now to step 48 of FIG. 2, when it is determined that the identifier (e.g., telephone number or server address) is already associated with an established account, processing advances to step 92 at which access station 12 makes a determination whether a previous LIDB check (e.g., that check made at step 60) has been made within a predetermined time frame. For example, as illustrated, the access station 12 queries whether a LIDB response related to the BTN is present. As indicated, if a LIDB response is present in the database, processing advances directly to step 68, and the ISP modem dialing table is retrieved, and processing continues in the manner illustrated and previously described. Alternatively, however, when a determination is made at step 92 that a LIDB response is not present in database, processing advances to step 50, and the illustrated and previously described tree following step 50 is executed. In other words, the step or steps associated with steps 50, 54, 56 and/or 60 are processed, thereby providing a validation procedure.

With reference now to FIG. 4, an example of an invoice sent to the user of electronic terminal 14 is illustrated. In particular, the access station 12, upon receipt of on-line time associated with electronic terminal 14, stores data indicative of the on-line time in the established account corresponding to electronic terminal 14. Accordingly, stored in the account associated with electronic terminal 14 is, for each access event, a date of the access event, a time of day of the access event, the time associated with the access event, and accumulative charge associated with the access event. Additionally, other information associated with the place and telephone number called to achieve the access, rate information, etc., may also be stored in the account in conjunction with each access event. Then, at the end of a selected billing cycle, such as a one month billing cycle, data is retrieved and placed on an invoice along with other charges associated with the billable telephone number, such as long distance charges, taxes, etc. Alternatively, the information retrieved from the Internet access account associated with electronic terminal 14 may be transmitted to another billing entity, for consolidation on a printed or electronic invoice.

From the foregoing, it is seen that the present invention is a highly useful system for accessing the Internet via an electronic terminal, where charges associated with Internet access time are billed directly to a bill associated with the electronic terminal, or the telephone line from which the terminal accesses the Internet. Additionally, the system 10 is useful for approving access only to those electronic terminals 14 or individuals which have predetermined criteria. In other words, access station 12 is useful for preventing access where statistical information indicates that the terminal from which access is desired may be associated with an undesirable credit risk or, alternatively, where the terminal from which access is desired is within a particular network such that billing will be cumbersome or possible, or where the telephone line associated with the electronic terminal is otherwise not a valid line.

Additionally, as will be understood and appreciated, in a preferred embodiment of the present invention, a multitude of electronic terminals 14 are utilized to access the Internet via system 10. In other words, proprietors of access station 12 will have relationships with a wide variety of carriers associated with the communications network, such that a wide variety of individuals may utilize an electronic terminal for accessing the ISP via the access station 12, and thereafter be billed on a per time basis, for the Internet access, preferably on an invoice directly associated with a particular carrier or telephone line.

From the foregoing it will be seen that this invention is one well adapted to attain all ends and objects hereinabove set forth together with the other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings interpreted as illustrative, and not in a limiting sense.

What is claimed is:

1. A system for accessing an electronic network via a service provider, said system comprising:
    an electronic terminal having an associated identifier;
    an access station which establishes an account and transmits connection information back to said electronic terminal, wherein the account is established based upon an investigation of a local exchange carrier database;
    a first communication link to link said electronic terminal and said access station wherein said identifier associated with said electronic terminal is transmitted to said access station; and
    a second communications link between said electronic terminal and said service provider, said second communications link initiated between said electronic terminal and said service provider based upon said connection information,
    wherein said service provider monitors a time of said second communications link and transmits data indicative of said time to said access station.

2. The system as set forth in claim 1, where in said access station associates said time with said account for billing purposes.

3. The system as set forth in claim 2, wherein said identifier of said electronic terminal is a telephone number.

4. The system as set forth in claim 3, wherein said electronic terminal is portable, and when said electronic terminal is used at a remote location from a home port associated with said telephone number, said access station requires entry of additional information.

5. The system as set forth in claim 4, wherein said additional information corresponds to said account.

6. The system as set forth in claim 4, wherein said additional information is indicative of dialing instructions at said remote location.

7. The system as set forth in claim 3, wherein a monetary amount corresponding to said time of said second link is charged to said telephone number.

8. The system as set forth in claim 1, wherein said access station associates a task with said identifier of said electronic terminal, wherein a password is transmitted to said electronic terminal via said first communications link and to said electronic network service provider via a third communications link.

9. A system for accessing an electronic network via an electronic network service provider, said system comprising:

an electronic terminal having an associated identifier and configured to access said electronic network;

an access station, configured to link with said electronic terminal, to store data indicative of said identifier, and to provide said electronic terminal with information associated with said electronic network service provider for use by said electronic terminal in linking with said electronic network service provider responsive to an investigation of a local exchange carrier database, wherein, once a link between said electronic terminal and said electronic network service provider is established, said electronic network service provider monitors a number of time units associated with said established link and transmits data indicative of said time units to said access station for use in billing matters.

10. The system as set forth in claim 9, wherein said identifier associated with said electronic terminal is a telephone number associated with a subscriber.

11. The system as set forth in claim 9, wherein said identifier is an electronic address associated with a subscriber.

12. A method of accessing the Internet with an electronic terminal and via an Internet service provider (ISP), said electronic terminal having an associated identifier, said method comprising:

initially linking said electronic terminal with an access station via a first communications link;

establishing an account at said access station corresponding to said electronic terminal responsive to an investigation of a local exchange carrier database;

transmitting from said access station to said electronic terminal ISP connection information pertaining to said ISP;

using said connection information to link said electronic terminal with said ISP via a second communications link;

monitoring time units associated with said second communications link at the ISP;

multiplying said time units by a monetary rate to thereby obtain billing data; and associating said billing data with said established account for billing purposes.

13. The method as set forth in claim 12, wherein establishing said account further comprises:

determining an identifier associated with said electronic terminal; and using said identifier to establish a billing identifier.

14. The method as set forth in claim 13, wherein establishing an account further comprises:

establishing a password for said account.

15. The method as set forth in claim 14, further comprising:

transmitting said billing identifier, said password, and an identifier associated with said ISP to said electronic terminal as part of said connection information.

16. The method as set forth in claim 15, further comprising:

additionally transmitting said billing identifier and said password to said Internet service provider via a third communications link.

17. The method as set forth in claim 16, when said electronic terminal links with said Internet service provider via said second communications link, the method including transmitting said billing identifier and said password from said electronic terminal to said Internet service provider and comparing said billing identifier and said password transmitted via said second link with said billing identifier and password transmitted via said third link for log on purposes at said ISP.

18. A method of accessing the Internet with an electronic terminal and via an Internet service provider, said electronic terminal having an associated identifier, said method comprising:

initially linking said electronic terminal with an access station via a first communications link;

establishing an account at said access station corresponding to said electronic terminal responsive to an investigation of a local exchange carrier database;

transmitting from said access station to said electronic terminal ISP connection information pertaining to said ISP;

using said connection information to link said electronic terminal with said Internet service provider via a second communications link; and associating billing data with said established account at said ISP for billing purposes.

19. The method of claim 18, wherein said identifier is a telephone number.

* * * * *